April 21, 1942.　　C. W. FRYCKSTROM ET AL　　2,280,401
TIRE RECAPPING MACHINE
Filed Aug. 31, 1938　　3 Sheets-Sheet 1

Inventors:
Chester W. Fryckstrom
Victor A. Nelson
by
Attorneys.

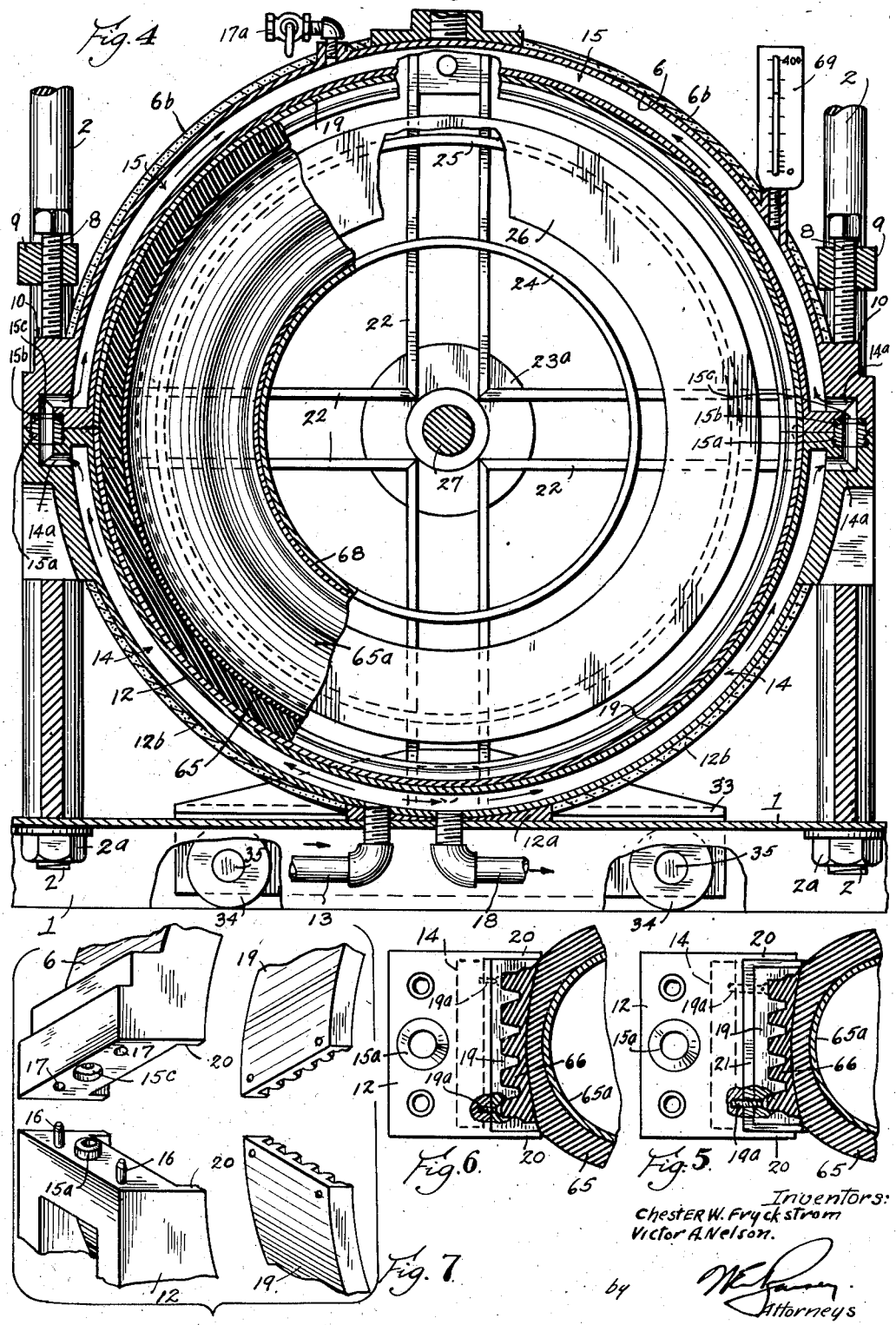

April 21, 1942.　　C. W. FRYCKSTROM ET AL　　2,280,401
TIRE RECAPPING MACHINE
Filed Aug. 31, 1938　　3 Sheets-Sheet 3
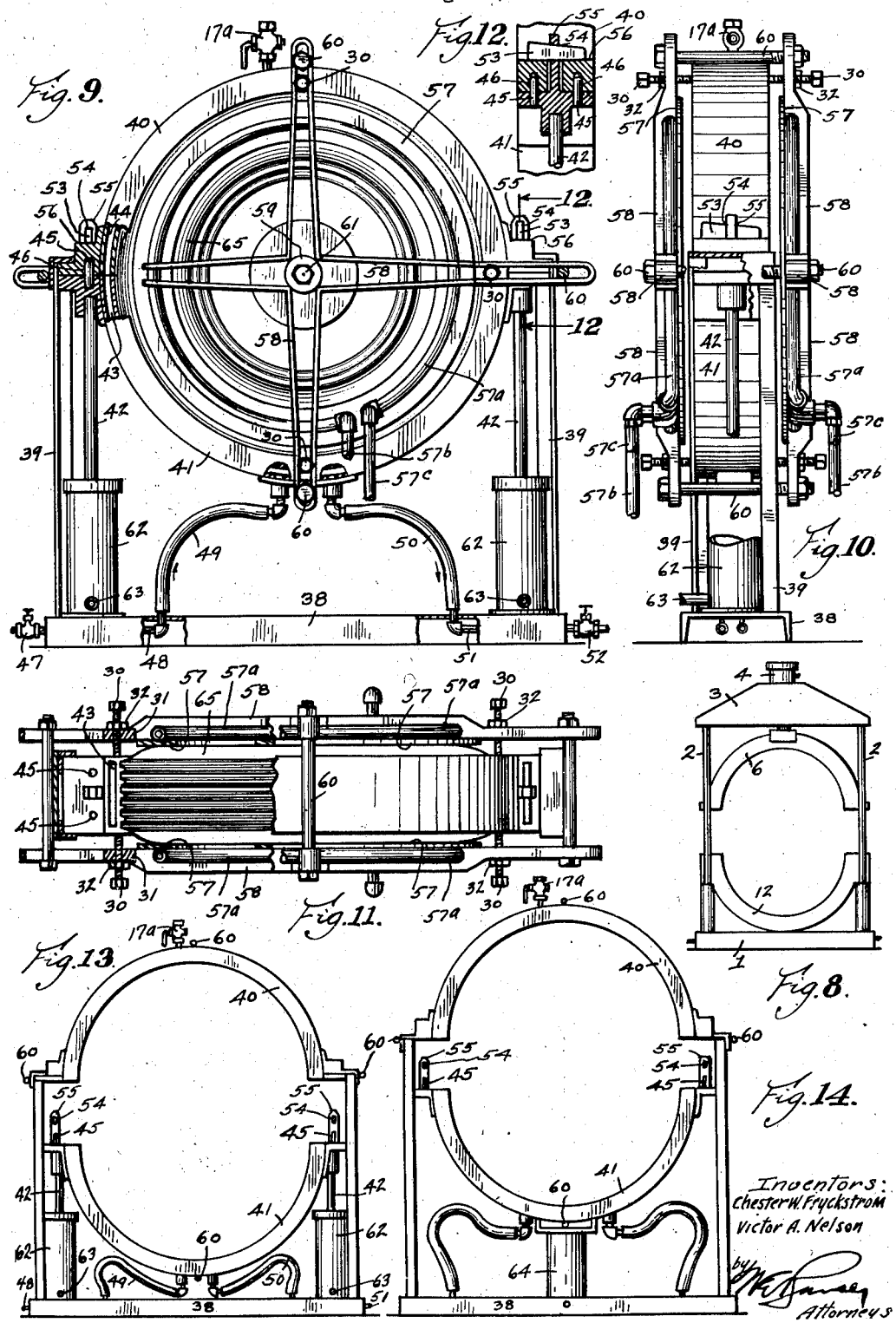

Patented Apr. 21, 1942

2,280,401

UNITED STATES PATENT OFFICE 2,280,401

TIRE RECAPPING MACHINE

Chester W. Fryckstrom and Victor A. Nelson, Portland, Oreg.

Application August 31, 1938, Serial No. 227,714

9 Claims. (Cl. 18—18)

Our invention relates to the repairing of worn motor vehicle tires by recapping the tread thereof with a new wearing surface.

The principal object of our invention is to provide means for curing said recapped tread at high temperature while the remainder of the tire remains at lower temperature. A high temperature is necessary to properly cure a rubber tread, but it would be injurious to the side walls of the tire where no new rubber is applied. By means hereinafter described, we apply heat to said tread to effectively increase the temperature thereof, and we simultaneously remove heat from the side walls thereby preventing high temperature of the latter.

A further object of our invention is to provide a tire recapping machine in which the tire is automatically positioned with respect to the mold so that the new tread defined by said mold will be correctly positioned on said tire. In order to prevent serious vibration, the tires of modern automobiles must be very accurately balanced laterally as well as circumferentially, and the inability of machines heretofore in use to properly position the new tread has resulted in many unsatisfactory recapped tires.

A further object of our invention is to provide a tire recapping machine in which the side walls of said tire may be supported in such a way during the recapping process that the recapped tire will have a shape substantially the same as when new, said shape being conducive to long wear. An old tire is more nearly round, in cross-section, than a new tire; in other words, the side walls of a new tire are substantially flat, whereas the side walls of a used tire become distended. If the side walls of an old tire are flattened by proper supports during the recapping process, the portions thereof adjacent the tread will remain flat thereafter, and the stresses communicated to the side walls by the new tread will be correctly distributed.

A further object of our invention is to provide means for recapping tires whereby said tires may be inflated to a pressure substantially greater than normal during the recapping process without interfering with the operation of the machine, and without unduly distending said tires to distort the various layers thereof. High pressure during the recapping process assures close contact between the tread and the mold, and uniform heat transfer is thereby facilitated. Furthermore, high pressure during the curing process seemingly results in a finer grained and more durable tread.

A further object of our invention is to provide a recapping machine which is readily adaptable to tires of different sizes, and in which it is not necessary to wait for said machine to become cool before adjusting it to accommodate a different size of tire.

We are aware that tire molds have heretofore been used in which the tire is placed in a solid mold, but we have found it difficult properly to position a tire in said molds. Other molds have been used which are split thru their central longitudinal plane. Such molds offer the additional disadvantage in that they heat the side walls of said tire unduly. Other molds have been used which are split transversely in which the two halves are joined by a hinge joint whereby the new tread is crowded to one side of the tire when said mold is closed. We provide a mold that is split transversely and provide means whereby the two halves of said mold are moved toward and from each other without rotation. We thus promote accuracy in placing the tire in the solid mold, avoid excessive heating of the side walls that occurs when molds split on a longitudinal median line are used, and avoid crowding of the tread as with the hinged mold.

Furthermore, our construction permits steam for heating to be applied throughout the entire 360° of the periphery of the tire, thus preventing soft spots in the tire at the unheated portions of the mold—a result not before attained with transversely split molds.

Other objects and details of our invention will be apparent from the following descriptions thereof with reference to the following drawings, in which:

Fig. 4 is an enlarged fragmentary section taken along the line 4—4 of Fig. 3 with a portion of a tire shown in place in the mold;

Fig. 5 is a diagrammatic detail view showing a matrix and adapter in place in the mold;

Fig. 6 is a diagrammatic detail view showing said matrix and said mold without said adapter;

Fig. 7 is a perspective view showing the relative position of the parts of said mold and said matrix at a joint thereof;

Fig. 8 is a diagrammatic illustration of said machine with the movable parts of the mold in its raised position;

Fig. 9 is an elevation of a tire recapping machine embodying a modification of our invention with a portion of one side thereof shown broken away to disclose the operating mechanism;

Fig. 10 is an end view of said modification with portions thereof shown broken away;

Fig. 11 is a plan view of said modification with a portion of the mold shown broken away to disclose a tire in position therein;

Fig. 12 is a fragmentary section taken along the line 12—12 of Fig. 9;

Fig. 13 is a diagrammatic illustration of said modification with the movable part of the mold shown in its lowered position; and Fig. 14 is a diagrammatic illustration of a machine embodying a further modification of our invention with the movable part of the mold thereof shown in its lowered position.

Figures 1, 2:
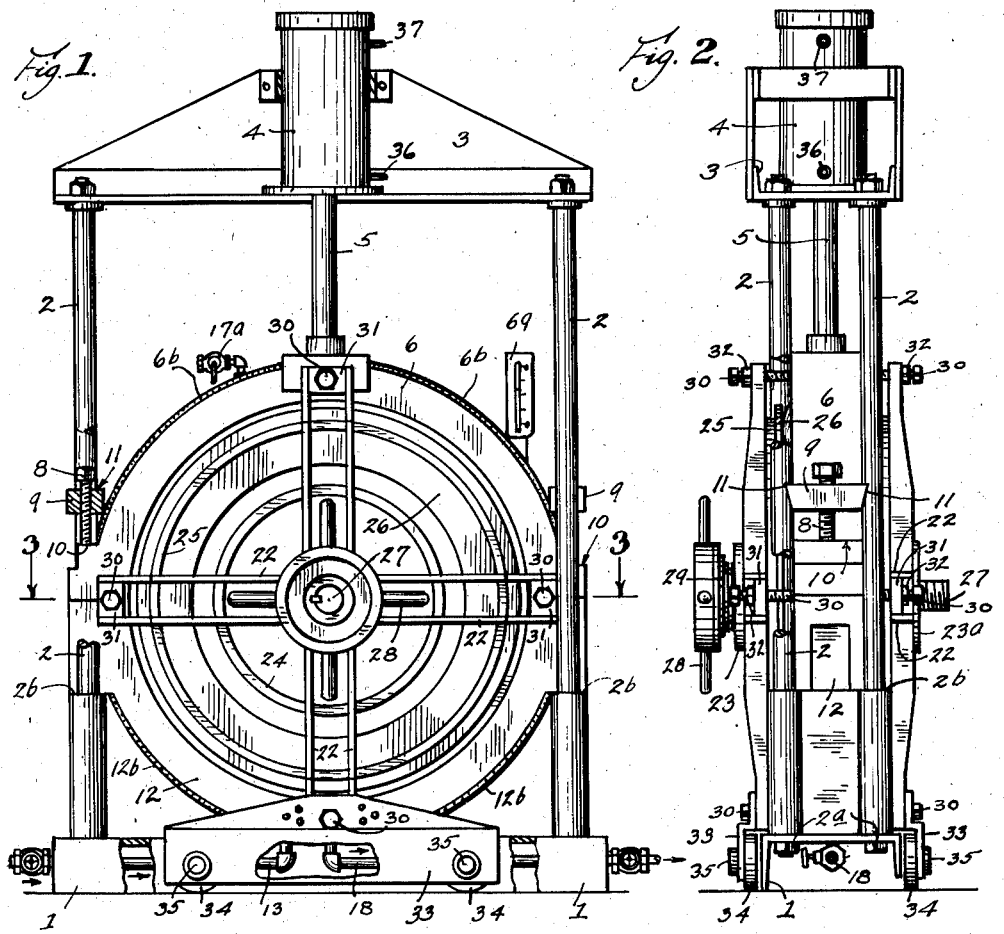
Fig. 1 is an elevation of a tire recapping machine embodying our invention with a portion of one of the posts shown broken away to disclose parts of the operating mechanism.
Fig. 2 is an end view of said machine with the posts shown broken away.

A machine embodying our invention is mounted on frame 1. Four upright posts 2, positioned near the corners of said frame and secured thereto by nuts 2a, carry a head frame 3 on which is mounted a hydraulic cylinder 4. Within said cylinder, a piston (not shown) is fixedly secured to the end of a piston rod 5. Said rod carries on its lower end the upper half 6 of a mold 7. Said upper half is adapted to be raised or lowered by piston rod 5 and to be guided near its corners between posts 2, as is shown more clearly in Fig. 3. Said upper half does not rotate in closing, as a hinged mold would do.

When said upper half is lowered to its operating position for recapping a tire, it is adapted to be held there by cap screws 8 threaded thru wedge member 9 and engaging projections 10 on said upper half. The upper corners of wedges 9 are adapted to engage notches 11 in posts 2, as is shown more clearly in Fig. 2, thereby securely holding said upper half down. It is apparent that, when cap screws 8 are tightened, said wedge member will be securely held in said notches, and that the entire structure is adapted to withstand the large forces incident to over-inflating a tire within said mold. Said upper half may be covered by an asbestos jacket 6b to retain heat.

A lower half 12 of mold 7 is supported by frame 1 and shoulders 2b of posts 2 in position to meet upper half 6, when the latter is lowered, and to form therewith a circular shell somewhat larger than the tire to be capped. A block 12a may be positioned between said frame and said lower half to support the latter. Thus, the two half molds are held together by screws at either side and by piston rod 5 at the top and block 12a at the bottom. We prefer to cover said lower half with an asbestos jacket 12b to retain heat.

As is shown more clearly in Fig. 4, a steam pipe 13 is positioned to conduct steam to channel 14 in said lower half. Channel 15 in said upper half is positioned to form a continuation of channel 14, being connected thereto by passageways 14a, and to receive steam therefrom. A nipple 15a threaded into said lower half is adapted to engage packing 15b in recess 15c to prevent leakage of steam. Alinement of said passageways is assured by pins 16 which are adapted to fit snugly into holes 17, said pins being threaded into said lower half. Channels 14 and 15 extend across substantially the full width of the mold, as well as the full circumference thereof, and they are, therefore, adapted to heat said mold uniformly.

The direction of flow of steam entering channels 14 and 15 is indicated by the arrows therein. It will be understood that, if said steam should condense in said channels, the water therefrom would travel under gravity in a direction generally opposite said arrows to the outlet pipe 18. Any convenient steam generator may be used to supply said steam, and pipe 18 may connect with said generator thereby to return the condensate and to circulate said steam. A petcock 17a is adapted to release air from said channels to make way for said steam.

As mentioned, the molds hereinbefore described are adapted to form a circular shell somewhat larger than the tire to be capped. It is intended that matrices 19 shall be placed between said tire and said molds. Said matrices are preferably shaped on their inner surface to give a non-skid tread to the capped tires, and they are preferably made of some good heat conducting material such as aluminum. As is shown more clearly in Fig. 6, matrices 19 are adapted to fit snugly between flanges 20 on the inner corners of halves 6 and 12, and to be held there by screws 19a. It is apparent that heat will be conducted by said matrices from said mold to the tire tread.

If a smaller tire is to be recapped, a smaller matrix should be used. Adapters 21 may be inserted between said smaller matrices and the molds. Said adapters may be made of a good heat conducting material such as aluminum. An advantage of our invention is that said matrices may be changed while the mold is hot, whereas, with machines heretofore used, it has been necessary to let the molds cool before the matrices could be changed.

Two spiders 22 are adapted to position and support the tire, one on each side thereof. Said spiders may be welded to central hub members 23 and 23a and a ring brace 24 may be welded to each spider to strengthen the same. A second ring 25 may be welded to said spider to act as a spacer between said spider and an annular disc 26 welded to said ring 25, the latter serving as a brace for said disc. Said annular disc should be attached to the inner side of said spider to abut against the side walls of the tire, as is shown more clearly in Fig. 3. We prefer to make said spider, said rings, and said annular disc of steel.

A screw 27 is adapted to be threaded into hub 23a. Said screw carries a handle 28 fixedly secured thereto and a thrustbearing 29 adapted to bear against hub 23 when said screw is tightened thus gripping the tire between annular discs. Collar 7b held on said screw by set screw 7a retains said screw in said hub.

In order to prevent shimmy of the wheels of a modern automobile, it is necessary that the wheels, including the tires, be accurately balanced laterally as well as circumferentially. This means that, if a recapped tire is to operate satisfactorily, the new tread must be placed symmetrically with respect to the longitudinal median plane of said tire, and this means that the mold must be positioned symmetrically with respect to said plane. Inasmuch as the lateral position of the tire is determined by the position of annular discs 26, it follows that the new tread will be properly located if said annular discs are positioned correctly with respect to the molds.

To this end, cap screws 30 are threaded thru transverse webs 31 welded to spiders 22 near the ends thereof. Said cap screws are adapted to abut against the molds thereby acting as stops by which the lateral movement of said annular discs may be regulated. The open construction herein disclosed gives the operator a clear view of said annular discs and said molds, thus facilitating the precise adjustment of the relative position thereof.

When said cap screws have been adjusted to correctly position said tire with respect to the molds when drawn against the same by screw 27, they may be secured in this position by locknuts 32 whereupon any number of tires of the same size may be automatically positioned for recapping. If tires of other sizes are to be recapped, they will be correctly centered if all the cap screws 30 on one side of the machine be turned, in the proper direction, the same amount that the similar screws on the other side of said machine are turned.

To facilitate removal of the spider assemblies hereinbefore described when a tire is to be placed in or removed from the recapping machine, said spider assemblies may, if desired, be mounted on truck frames 33 carrying wheels 34 secured thereto by spindles 35. By taking hold of the upper portion of said spider assemblies, the operator is enabled to remove said spider assemblies without lifting the same by wheeling them along the floor.

As mentioned, the upper half-mold is adapted to be lifted, when a tire is to be placed in said machine or removed therefrom, by a piston within cylinder 4. Said piston will be caused to so lift said half-mold if any suitable fluid, such as oil, be introduced into the lower part of said cylinder thru pipe 36 under pressure. Sufficient pressure of said fluid may be produced and controlled by any suitable means (not shown) and similar fluid may likewise be introduced into the upper part of said cylinder thru pipe 37 thereby to force said half-mold firmly against its mate, where it may then be locked by means hereinbefore described. It will be understood that, when said upper half is lifted, the matrices and adapters, if the latter are used, may be easily removed by hand.

The modification of our invention illustrated in Fig. 9 to Fig. 13 utilizes alternative means for holding the two halves of the heater together and for separating said halves to permit a tire to be placed therein. Also, the spiders are of lighter construction and may be removed by hand without the aid of trucks. As is shown in Fig. 9, frame 38 carries upright members 39 welded thereto, and said upright members support upper half-mold 40 to which they are fixedly secured. Lower half-mold 41 is supported on piston rods 42 and may be raised and lowered thereby. Channel 43 in said lower half is adapted to meet channel 44 thereby to form a continuous circular passageway similar to that in the hereinbefore described form of my invention. Alinement of said channels is assured by pins 45 entering holes 46, said pins being press fitted into said lower half, and by upright members 39 which act as guides for said lower half.

Steam may be admitted to the circular passageway formed by channels 43 and 44, when valve 47 is open, thru pipe 48 and hose 49. After circulating thru said passageway, said steam can be released thru hose 50, pipe 51, and valve 52. Thus there is provided means for circulating steam thru said passageway to rapidly heat said mold. Said steam may be supplied from any suitable source, not shown. The temperature of said mold may be indicated by thermometer 69 in degrees Fahrenheit, if desired.

When the lower half-mold has been raised and pressed firmly against the upper half by said pistons, it may be held in this position by wedges 53, shown more clearly in Fig. 12, inserted in holes 54 in projections 55 on lower heater 41. Said wedges then bear against shoulder 56 of upper half 40 and they may, if desired, be driven in said holes thereby to hold the two heaters more firmly together.

It will be understood that herein the word "mold" is used to indicate the annular structure used to heat the tire, and that ordinarily two matrices and possibly two adapters will be placed in said mold to hold and shape said tire. However, we do not wish to limit our invention to the structure wherein removable matrices are used; the heating and molding elements may be constructed integrally if desired.

Annular discs 57 welded to spiders 58 are adapted to support and to position the tire to be recapped. Said spiders may be welded to hubs 59, and the two said spiders may be drawn together, thereby to grip said tire between annular discs 57, by four bolts 60 arranged near the ends of the arms of said spiders and by bolt 61 thru the hubs thereof. It is apparent that, when the nuts on said bolts are tightened, said spiders will be drawn together at several points and that, consequently, they may be of lighter construction than when only one bolt is used, although the latter is more convenient to tighten and loosen.

We prefer to make sure that the side walls of the tire being recapped remain cool. To this end, we provide tubes 57a adapted to receive water from any convenient source thru end 57b. Tubes 57a may be soldered to the outsides of annular discs 57. After circulating thru tubes 57a and removing heat from annular discs 57, thereby to cool the side walls of the tire in contact therewith, said water may be discharged thru end 57c of said tube into any convenient drain or receptacle.

The problem of stopping said annular discs in the proper lateral position is similar to that hereinbefore discussed, and is similarly solved by cap screws 30 and locknuts 32, said cap screws being adapted to abut against the heaters to limit the travel of said discs.

Piston rods 42 carry pistons (not shown) on their lower ends within cylinders 62. A suitable fluid may be admitted to said cylinders thru pipes 63 under pressure sufficient to lift the lower half of the mold and press it firmly against the upper half. Said pressure of said fluid may be produced by any convenient means. If desired, said lower half may be lifted by a single cylinder 64 as is illuustrated in the modification of our invention shown in Fig. 14.

The operation of our invention may be as follows: A worn automobile tire prepared for recapping appears in cross section as is shown at 65 in Fig. 6. A flat strip of rubber, or a special compound thereof, is cemented to the wearing surface of said tire to form a new tread thereon. Said flat strip is shown at 66 of Fig. 6 as it appears after being shaped by the matrices.

An ordinary inner tube 65a is inserted in said tire in the usual way, and said tire and tube are then mounted on an ordinary rim 68. The tire is then placed in the mold and the two halves of said mold are closed and fastened securely together. We then prefer to inflate the tire to a pressure of about 100 pounds per square inch momentarily and then release the air. The purpose of this temporary inflation is to seat the new tread thoroughly in the matrix to avoid the formation of air pockets therebetween. Said preliminary heating is particularly important when placing a tire in a hot mold, since rubber swells a great deal when heated and there is a tendency for it to stick to the metal and form a seal around the edges of the matrix, thereby entrapping air. However, if the tire is inflated quickly when it is placed in the mold, said air will be forced out. The tire may be inflated in the ordinary way thru filler tube 67. We have found that, with our type of mold, it is unnecessary to provide vent holes therein, which vent holes have permitted rubber to leak out of molds heretofore used.

Next, we prefer to place the side supports in position and to adjust and tighten them while the air is escaping from the tube. The tire should previously have been placed in the mold in, as nearly as possible, the correct position; but it can not have been so placed with sufficient accuracy. It is necessary to carefully adjust cap screws 30 to act as stops thereby positioning said tire correctly with respect to the mold and also slightly flattening the side walls of said tire.

With the side supports in position, the tire should be inflated to a pressure preferably somewhat above normal. The steam may then be turned on to heat the molds, and the tire should then be left for sufficient time to cure the new tread. Inasmuch as, with the means herein described, a higher temperature may be used at the tread without excessively heating the remainder of the tire, said curing time will be somewhat less than that ordinarily used. This saving in time is important, since it usually requires from 2 to 3 hours to properly cure a new tread.

Figure 3:
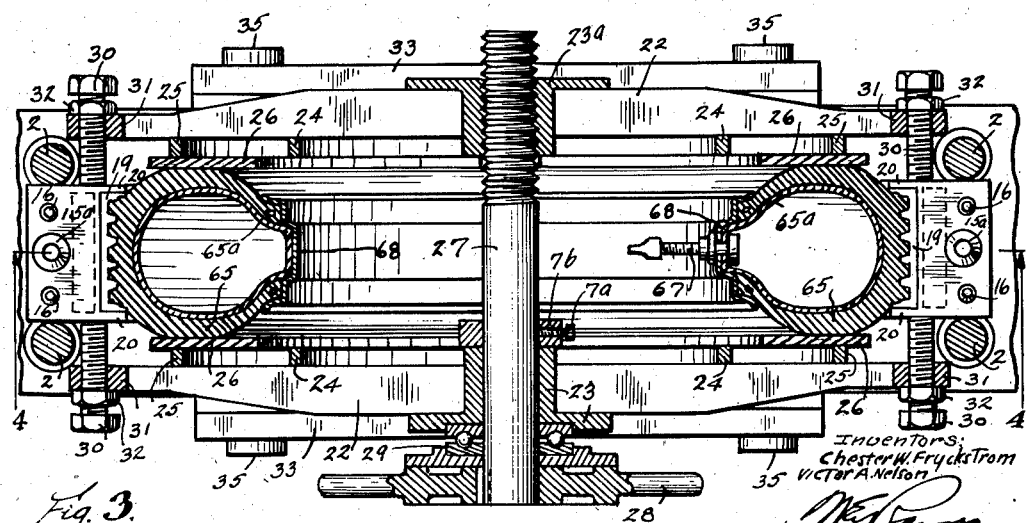
Fig. 3 is an enlarged section taken substantially on the line 3—3 of Fig. 1.

The problem of heating the tread of a tire with as little heating of the remainder of the tire as possible, together with our solution of said problem, will be explained with reference to Fig. 6 and Fig. 3. The recapping process requires that strip 66 and that portion of the tire immediately adjacent thereto be heated to a high temperature. The problem is to prevent heating the remainder of the tire to a high temperature, and it is particularly important to prevent high temperature of the side walls, since injury thereto by heat is a common cause of blowouts in recapped tires.

In accordance with the well known fact that heat will flow from a point of higher temperature to one of lower temperature, it is inevitable that heat will flow from said strip to said side walls if the latter are maintained at lower temperature than the former. The problem, then, reduces to one of removing the heat that will necessarily be transferred to the side walls rapidly enough to prevent excessive temperature thereof; it is high temperature rather than heat per se that is injurious to the tire. Furthermore, if said heat is removed from said side walls immediately adjacent the part of the tread being heated, the remainder of the side walls will not be subjected to excessive heating. There appears to be a certain temperature of rubber, and some other materials commonly used in tires, above which injury takes place rapidly. We prefer not to heat any part of the tire to a temperature higher than about 185 degrees Fahrenheit, except as such heating may be necessary for proper curing of the tread.

The annular discs hereinbefore described effectively remove heat from the side walls by conducting said heat to other parts of the machine from which it is transferred to the atmosphere mostly by convection. Also, during the time between operations, said machines becomes cool and then it is in condition to absorb considerable heat from the side walls. It will be understood that heat will flow from the annular discs only to cooler parts of the machine, such as the central parts shown in Fig. 3, and that heat will tend to flow toward said discs from the heaters. The latter flow of heat will take place thru cap screws 30 and will ordinarily be small, but it may, if desired, be further reduced by interposing insulating discs between said cap screws and the heaters.

We regard the removal of heat from the side walls of tires during the recapping process as of great importance in preventing blowouts, and it permits higher temperature of the tread thereby assuring a good bond between the latter and the old tire. To facilitate said removal of heat from the side walls of large tires, we provide tubes 57a for circulating water along the annular discs, as previously described. However, it is not necessary that said tubes be used. The open construction herein described permits air to circulate therethru, and this aids in cooling the side walls of the tire.

Machines heretofore used to recap tires have held said tire in a horizontal position wherein parts of said machine have effectively prevented such circulation of air as might help cool said tire. Furthermore, these machines have included metal parts connecting the heaters with the sidewalls that conduct heat to the latter, whereas we reduce this undesired flow of heat by connecting said heater to said side walls only by four cap screws, on each side, and we may further reduce said flow of heat by insulating material, since said cap screws merely abut against said heaters thereby to act as stops.

Having described the utility of the annular discs which form part of our invention in preventing injurious temperatures of the side walls of a tire being recapped, we will now explain two other functions of said discs, namely, automatically centering said tire and supporting the side walls thereof. It will be apparent that, after the new tread has been cemented to the tire as hereinbefore described, said tread will be subject to some movement with respect to said tire; it will flow enough to conform to the shape and position of the molds. If the tire is not properly alined with the molds during the recapping process, the tread will not be properly alined with the tire thereafter. By means of the annular discs, which are adapted to grip the tire from both sides, and the cap screws which act as adjustable stops for the same, we are enabled to center a tire properly with respect to the molds and said centering will be automatic thereafter for tires of the same size.

The importance of placing the new tread on the old tire symmetrically therewith, and the accuracy required in such placing, will be apparent from the fact that an improperly placed tread may cause the wheel carrying said tire to shimmy, a result particularly serious with modern balloon-type tires especially when operated at high speeds. To illustrate a common cause of shimmy, suppose that a tread is not properly centered on a tire—suppose it is too far "out" on one side and to far "in" on the opposite side. If the wheel runs true, the track made by said tire will then be a wavy line due to the tread being improperly centered on the tire.

This wavy motion of the tire results in the wheel being moved periodically in a substantially vertical direction, but said motion will not be exactly vertical. It will be a slight longitudinal rotation of the front axle, and this motion will be coupled gyroscopically to the rapidly rotating wheel, resulting in a lateral oscillation of said wheel known as shimmy.

The need for support for the side walls of a tire during the recapping process arises from the application of forces exceedingly complex in nature. Suffice it to say that the stresses within a worn tire are different from those in a new tire due to the wearing away of the tread; that these different stresses cause said tire to assume a different shape, the side walls being more distended; and that, if the tire be recapped with the side walls in this distended condition, the stresses therein will not be most advantageously distributed, whereas, if the side walls are supported properly during the recapping process, said stresses will be substantially the same as in a new tire, which is designed to withstand said stresses most advantageously, because the new tread will be of substantially the same size and shape as the original.

A modern automobile tire, when new, is not wholly a pneumatic device; the carcass of the tire lends considerable support to the tube therein by its rigidity. One of the purposes of our invention is to restore said rigidity to old tires by properly supporting the side walls thereof during the recapping process by means of annular discs. We prefer said tires to be highly inflated while recapping, and we therefore provide means for exerting a force of a ton or more on said discs for the purpose mentioned.

Some machines heretofore used for recapping tires have had solid molds, that is the two halves are constructed integrally. Others have used molds split thru the longitudinal median plane. Tires placed in either of these types of machines will have their treads stretched laterally, that is, the sides of the treads will be distorted either by the molds or by the flexing of the side walls necessary to place a tire in the solid mold. Then, when the new tread has been firmly bonded to the old tire and released from the mold, the new tread will be compressed and will not serve its normal purpose of acting as a highly resilient cushion. We deem it important that the tire have its normal shape, except for the flattening of the side walls herein described, while the new tread is cured, and accordingly we provide a mold that opens and closes in such a way that the tire and new tread can be placed therein quickly and without distortion of said tire or tread.

We have found that if a mold is split transversely, it is desirable that the means for locking the two halves together should be arranged close to the tire; and it is necessary to make said mold halves and said fastening means strong enough to withstand the force due to the pressure of the tire. If said mold halves give slightly, as they are likely to do if the fastening means is placed too far from the tire, rubber will leak thru the crack thus formed.

We prefer to have a steam channel extend around the complete circumference of the mold in order that there shall be no cool spot at the junction of the mold halves thereby causing a soft spot in the tire. Also, if the steam channel extends completely around the mold, the steam may be admitted thereto thru the stationary half and no flexible steam hose is required. But it is difficult to provide a joint in said steam channel that will not leak when pressure is applied to the molds by the inflated tire; the problem differs from that of preventing leakage of rubber in that the steam is less viscous, and it is under high pressure. We have found that a tight joint can be provided without making the parts unduly heavy if the joint in the steam channel is placed directly under the fastening means for the mold halves, as is shown clearly in Fig. 4. We also provide a support under the lower half mold which, by opposing the force exerted by the hydraulic cylinder above, tends to prevent springing of the mold which might cause leakage of steam or rubber. We have found it advantageous to leave the pressure on said hydraulic cylinder during the curing period.

Unless it appears advisable to remove the tire to be recapped from its rim to examine the interior of said tire, it may be recapped in our machine without such removal, thereby saving considerable labor. This procedure is feasible only if the sidewalls of said tire are cooled sufficiently to prevent excessive temperature of the inner tube, since said inner tube may have so-called cold patches that would be loosened by high temperature. We have found that, with our machine, tubes having cold patches are not injured even when the treads of the surrounding tires are thoroughly cured.

Heretofore, two types of molds have been used. One, used with solid molds, has presented a flat surface to the tire, that is, the interior surface of the matrices is a cylinder. This is objectionable in that the matrices do not fit the worn tire sufficiently closely to prevent leakage of rubber, but the construction is necessary with solid molds in order that the tire may be placed therein. The second type of mold has been used with machines wherein said mold is split thru its longitudinal median plane, and it has had skirts that extended well down the sides of the tires. This is objectionable because of the heating of the side walls, and for other reasons. We have found that the edges of our matrices can be extended toward the tire sufficiently to assure a tight union therewith, but without extending along the side walls to heat the latter. The shape of matrix that we prefer is shown in Figs. 5 and 6.

We claim:

1. In a tire recapping machine, a frame, an annular mold comprising two separable halves adapted to abut one with the other upon their transverse median line, said mold extending generally in a vertical plane with the parting line of said mold halves extending generally horizontally, separable laterally adjustable plane-faced side elements adapted for engagement with a tire arranged in said mold, said side elements being physically spaced from said mold halves, and a common adjusting device for said side elements adapted to move said side elements equally toward and from the general plane of said mold.

2. In a tire recapping machine, a frame, an annular mold comprising two separate halves adapted to abut one with the other upon their transverse median line, said mold extending generally in a vertical plane with the parting line of said mold halves extending generally horizontally, separable laterally adjustable plane-faced side elements adapted for engagement with a tire arranged in said mold, said side elements being physically spaced from said mold halves, a common adjusting device for said side elements adapted to move said side elements equally toward and from the general plane of said mold, and radially extending stiffening elements overlying and engaging the outer faces of said side elements, said common adjusting device being secured to said stiffening elements.

3. In a tire recapping machine, a frame, an annular mold comprising two separable halves adapted to abut one with the other upon their transverse median line, said mold extending generally in a vertical plane with the parting line of said mold halves extending generally horizontally, separable laterally adjustable plane-faced side elements adapted for engagement with a tire arranged in said mold, said side elements being physically spaced from said mold halves, a common adjusting device for said side elements adapted to move said side elements equally toward and from the general plane of said mold, and radially extending stiffening elements overlying and engaging the outer faces of said side elements, said common adjusting device engaging both of said stiffening elements, being screw-threaded to one of them.

4. In a tire recapping machine, a frame, an annular mold element comprising two separable halves said mold extending over the area of the tire to be capped and slightly down the side walls of said tire, said mold extending generally in a vertical plane with the parting line thereof extending generally in a horizontal plane, said frame defining a guideway, means for spacing said halves relatively, said means functioning to force one of said halves along said guideway, means for heating said mold halves, side members arranged at opposite sides of said guideway and adapted to engage the sides of a tire in said mold, devices for centering said side members with respect to the general plane of said mold, said side members being physically spaced from the mold halves and adapted to dissipate heat from the tire sides, and screw means for drawing said side members toward and from each other, said side members being flat upon their inner faces and being adapted to compress the tire sides between them under substantial pressures.

5. In a tire recapping machine, a frame, an annular mold element comprising two separable halves, said mold element extending generally in a vertical plane with the parting line of said mold halves extending generally horizontally, said frame defining a guideway, means for moving said halves relatively to each other, said means functioning to force one of said halves along said guideway, means for heating said mold halves, and side members arranged at opposite sides of said guideway and adapted to engage the sides of a tire in said mold, said side members being physically spaced from the mold halves and adapted to dissipate heat from the tire sides, said frame including two spaced vertical members lying substantially tangential to the exterior of said mold element halves, a transverse member joined to said vertical members and extending transversely of the space between said vertical members, radially extending flanges carried respectively by said mold halves, said transverse member closely overlying said flanges, and means engaging said transverse member for exerting pressure against said radially extending mold flanges.

6. In a tire recapping machine, a frame, an annular mold element comprising two separable halves, said mold element extending generally in a vertical plane with the parting line of said mold halves extending generally horizontally, said frame defining a guideway, means for moving said halves relatively to each other, said means functioning to force one of said halves along said guideway, means for heating said mold halves, and side members arranged at opposite sides of said guideway and adapted to engage the sides of a tire in said mold, said side members being physically spaced from the mold halves and adapted to dissipate heat from the tire sides, said frame including two spaced notched vertical members lying substantially tangential to said vertical members the exterior of said mold element halves, a wedge-shaped transverse member joined to and extending transversely of the space between said vertical members, the ends thereof extending into said notched members, radially extending flanges carried respectively by said mold halves, said transverse member closely overlying said flanges, and means engaging said transverse member for exerting pressure against said radially extending mold flanges.

7. In a tire recapping machine, a frame, an annular mold element comprising two separable halves, said mold element extending generally in a vertical plane with the parting line of said mold halves extending generally horizontally, said frame defining a guideway, said frame including two spaced notched vertical members lying substantially tangential to the exterior of said mold element halves, a wedge-shaped transverse member joined to said vertical members and extending transversely of the space between said vertical members, the ends thereof extending into said notched members, radially extending flanges carried respectively by said mold halves, said transverse member closely overlying said flanges, and means engaging said transverse member for exerting pressure against said radially extending flanges.

8. In a tire recapping machine, a frame, a vertical annular mold comprising two separable halves adapted to abut one with the other upon their transverse median line, each mold half having a hollow bore adapted for internal heating, outstanding radial flanges arranged upon the parting line of said mold halves, communicating ports in said outstanding radial flanges, sealing devices in said ports extending across said parting line, clamping devices engaging said flanges, respectively, in substantial alinement with said ports, and steam intake and outlet ports communicating with the hollow bores of said mold halves.

9. In a tire recapping machine, a frame, a vertical annular mold comprising two vertically stacked separable halves adapted to abut one with the other upon their transverse median line, each mold half having a hollow bore adapted for internal heating, steam intake and outlet ports communicating with the hollow bores of said mold halves, said steam intake and outlet ports entering thru the lower of the two vertically stacked mold halves in close proximity to each other, the outlet port being arranged at the lowermost portion of the lower mold half, and communicating ports connecting the hollow bores in said mold halves at each side, said communicating ports opening into the upper mold half at the lowermost part of the bore therein.

CHESTER W. FRYCKSTROM.
VICTOR A. NELSON.